United States Patent [19]

Muratani et al.

[11] Patent Number: 4,748,622
[45] Date of Patent: May 31, 1988

[54] SATELLITE COMMUNICATION SYSTEM

[75] Inventors: Takuro Muratani, Kanagawa; Tatsuo Watanabe; Michihisa Ohkawa, both of Tokyo; Keiichiro Koga, Saitama, all of Japan

[73] Assignee: Kokusai Denshin Denwa Co., Ltd., Tokyo, Japan

[21] Appl. No.: 890,235

[22] Filed: Jul. 29, 1986

[30] Foreign Application Priority Data

Aug. 28, 1985 [JP] Japan .................... 60-187315

[51] Int. Cl.⁴ .............................................. H04J 3/06
[52] U.S. Cl. .................................... 370/100; 370/104
[58] Field of Search ..................... 370/75, 100, 104; 455/12, 13; 375/1, 3

[56] References Cited

U.S. PATENT DOCUMENTS

| | | | |
|---|---|---|---|
| 3,982,075 | 9/1976 | Jefferis et al. | 370/104 |
| 4,001,690 | 1/1977 | Mack et al. | 455/12 |
| 4,105,973 | 8/1978 | Arnold et al. | 370/104 |
| 4,320,503 | 3/1982 | Acumpora | 455/12 |
| 4,455,651 | 7/1984 | Baran | 455/13 |
| 4,506,383 | 5/1985 | McGann | 455/13 |
| 4,532,635 | 7/1985 | Mangulis | 370/104 |
| 4,617,674 | 10/1986 | Mangulis et al. | 370/104 |

Primary Examiner—Salvatore Cangialosi
Attorney, Agent, or Firm—Armstrong, Nikaido, Marmelstein & Kubovcik

[57] ABSTRACT

A satellite communication among a plurality of small earth stations (very small aperture terminal;VSAT) through a satellite is performed by using a relay earth station which has higher power than a small earth station. A signal goes from an originating small earth station to a destination small earth station, through a satellite, a relay earth station, and a satellite by using two hops propagation. Communication is carried out in digital form. The relay earth station regenerates digital signals from small earth stations. In the process of the regeneration of the digital signals, the error correction technique is applied to reduce the error rate, and a frequency compensation technique is also employed. Thus, a small simple earth station can provide high quality of communication with high C/N. A reference clock signal for operating a small earth station is derived from a reception signal from a satellite.

3 Claims, 6 Drawing Sheets

SATELLITE COMMUNICATION SYSTEM

BACKGROUND OF THE INVENTION

The present invention relates to a satellite communication system, in particular, relates to such a system using a stationary satellite with double hops transmission.

Conventionally, a satellite communication system has a single satellite, which illuminates a plurality of earth stations, and the communication between earth stations is performed directly through the satellite.

However, a small earth station using a small antenna is impossible in a prior art, except for some special cases like a mobile communication and/or a boat communication, because a small antenna has a relatively high side lobe radiation, which interferes with adjacent satellites. An antenna with the diameter 1–3 m is not enough for practical use in view of side lobe radiation.

One of the proposals for solving the above problems is a satellite communication system in which a modulated signal is spread over a wide bandwidth (SS modulation) to reduce the power density. However, when a plurality of small earth stations use the same carrier frequency, the total interference power may be still high, and therefore, the problem is not solved essentially.

An excellent antenna which has little side lobe radiation has been developed lately. An offset antenna is an example of that antenna. However, a further problem arises when the low side lobe small antenna is used. That problem is the low C/N (carrier to noise ratio) because of the low antenna gain due to small size of the antenna.

Therefore, a satellite communication between two small earth stations is difficult in the prior art.

SUMMARY OF THE INVENTION

An object, therefore, of the present invention is to overcome the disadvantages and limitations of the prior satellite communication system by providing a new and improved satellite communication system.

It is also an object of the present invention to provide a satellite communication system which couples small earth stations with excellent carrier to noise ratio without interfering with adjacent satellites.

The above and other objects are attained by a satellite communication system comprising a plurality of small earth stations. A relay earth station transmits at a higher power than that of the small earth station. A satellite is coupled with the small earth stations and the relay earth station. Originating small earth stations send modulated signals in a digital form to the relay earth station through the satellite. The relay earth station demodulates reception signal from a small earth station, effecting an error correction process to the demodulated digital signal, modulating demodulated reception signal, and sending a modulated signal to destination small earth station through a satellite. The communication among small earth stations is provided through the relay earth station.

BRIEF DESCRIPTION OF THE DRAWINGS

The foregoing and other objects, features, and attendant advantages of the present invention will be appreciated as the same becomes better understood by means of the following description and accompanying drawings wherein.

DESCRIPTION OF THE PREFERRED EMBODIMENTS

Figure 1A:
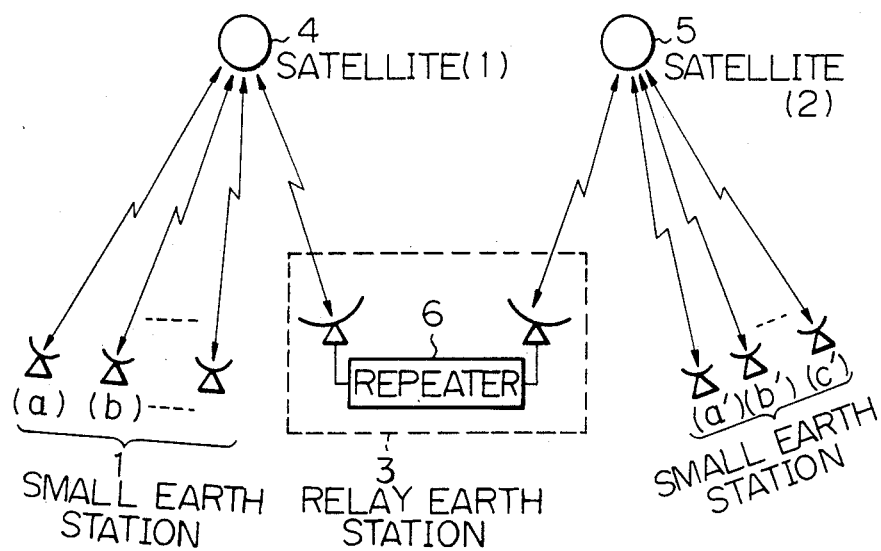
FIG. 1 shows a system configuration of the satellite communication system according to the present invention.

FIG. 1 shows the system configuration of the satellite communication system according to the present invention. In the figure, the numeral 1 shows a small earth station, which is subject to access to the first satellite indicated by the numeral 4. The numeral 2 is another small earth station which is accessed to a second satellite indicated by the numeral 5. The relay earth station 3 can access to both the first satellite 4 and the second satellite 5.

It is assumed that one small earth station (a) in the small earth station group 1 establishes a voice communication channel to the far end earth station (a') in another small earth station group 2. The small earth station (a) converts first a voice signal to a digital form, which is modulated with the predetermined carrier frequency, and is transmitted to the first satellite 4. The first satellite 4 converts the carrier frequency to that of the downward carrier frequency, amplifies the carrier frequency, and transmits the frequency converted signal to the relay earth station 3. The relay earth station demodulates the received signal to a digital signal. The relay earth station 3 handles not only the small station (a), but also all the small earth stations. The digital signal from each small earth station is multiplexed on a time axis, and the multiplexed signal is transmitted to the second satellite 5 by using the single carrier frequency. The second satellite 5 relays the multiplexed signal to the second small earth station group 2. Thus, the small earth station (a') in the group 2 can receive the multiplexed signal. Similarly, the voice signal from the earth station (a') in the group 2 to the earth station (a) in the first group 1 is transmitted through the second satellite 5, the relay earth station 3, and the first satellite 4. Thus, the communication channel is established between a first small earth station and a second small earth station.

Figure 1B:
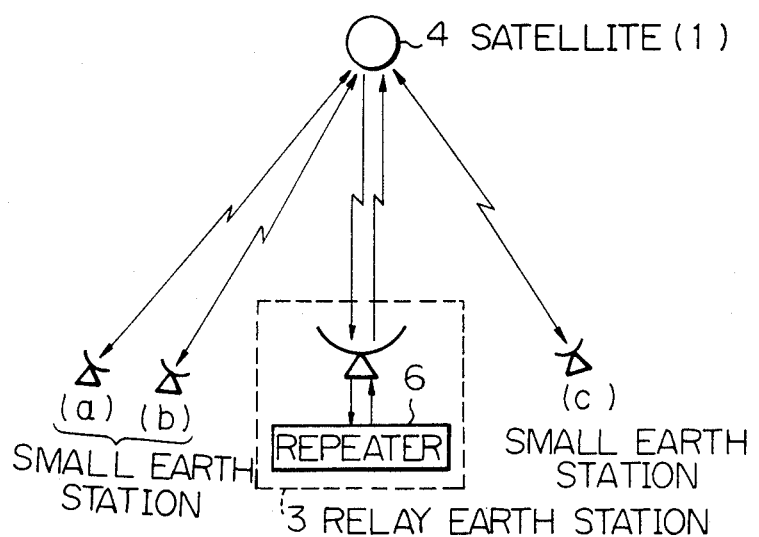

FIG. 1B shows the modification of above embodiment. In FIG. 1B, a single satellite 4 communicates with the first earth station, the second earth station, and the relay earth station. Also, the combination of the embodiments of FIG. 1A and FIG. 1B makes it possible to communicate among all the first group of stations 1 and the second group of stations 2.

One of the problems in the above configuration, in which many signals from the small earth stations are multiplexed on a time axis, is the synchronization of clock signals. If clock signals from each small earth station are not synchronized at the relay earth station, the multiplex operation in the relay earth station would be complicated.

Figure 2:
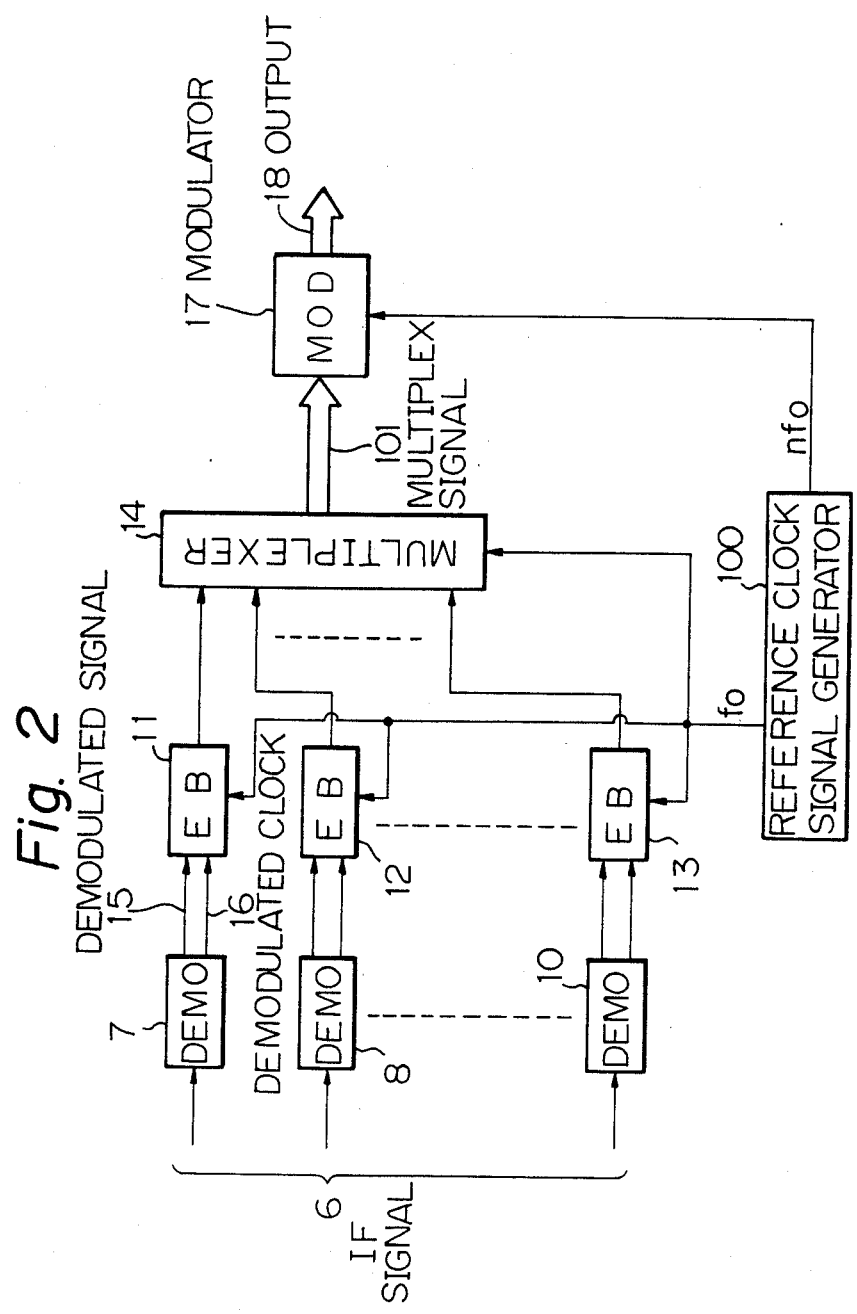
FIG. 2 is a block diagram of a modem in a relay earth station according to the present invention.

FIG. 2 shows a block diagram of a modem which solves the above synchronization problem.

In FIG. 2, the numeral 6 shows IF (intermediate frequency) signal group from each earth station. The numeral 7 is a demodulator for demodulating the IF signal 6. A receive clock signal is obtained in the demodulation process. The numeral 15 is the demodulated signal from the demodulator 7, and 16 is the reception clock signal. The numerals 8 through 10 are demodulators for reception signals from each small earth stations. The numerals 11 through 13 are elastic buffers, in which an output signal of each buffer is read out with the clock signal which differs from the input clock signal for writing the digital signal in the buffer. The numeral 100 is a reference clock signal generator installed in a relay earth station. The numeral 14 is the multiplexer of PCM signals, and 101 is multiplexed digital signal. The numeral 17 is a modulator for a multiplexed signal, and 18 is modulated output signal.

The relay earth station in FIG. 2 converts the reception signals from each earth station to IF signals, and demodulates the IF signals by using the demodulators 7 through 10. The demodulated signals are written into the elastic buffers 11 through 13 by using each clock signal derived from each reception signal. The elastic buffers are read out by using the common clock frequency $f_0$ from the reference clock signal generator 100. Thus, the input signals are synchronized with the reference clock frequency $f_0$. Each elastic buffer memory must have enough capacity for absorbing the difference between the input clock frequency and the output reference clock frequency $f_0$. When a clock signal of each small earth station is independent from each other, the phase difference between an input signal and an output signal of an elastic buffer memory would increase with time, and finally they become asynchronous. In order to solve that problem, according to the present invention, each small earth station takes a transmission clock signal based upon a reception clock signal from a relay earth station (through a satellite).

A conventional error correction circuit for correcting an error in a digital information is inserted between an output of a demodulators 7 through 10 and elastic buffers 11 through 13.

Figure 3:
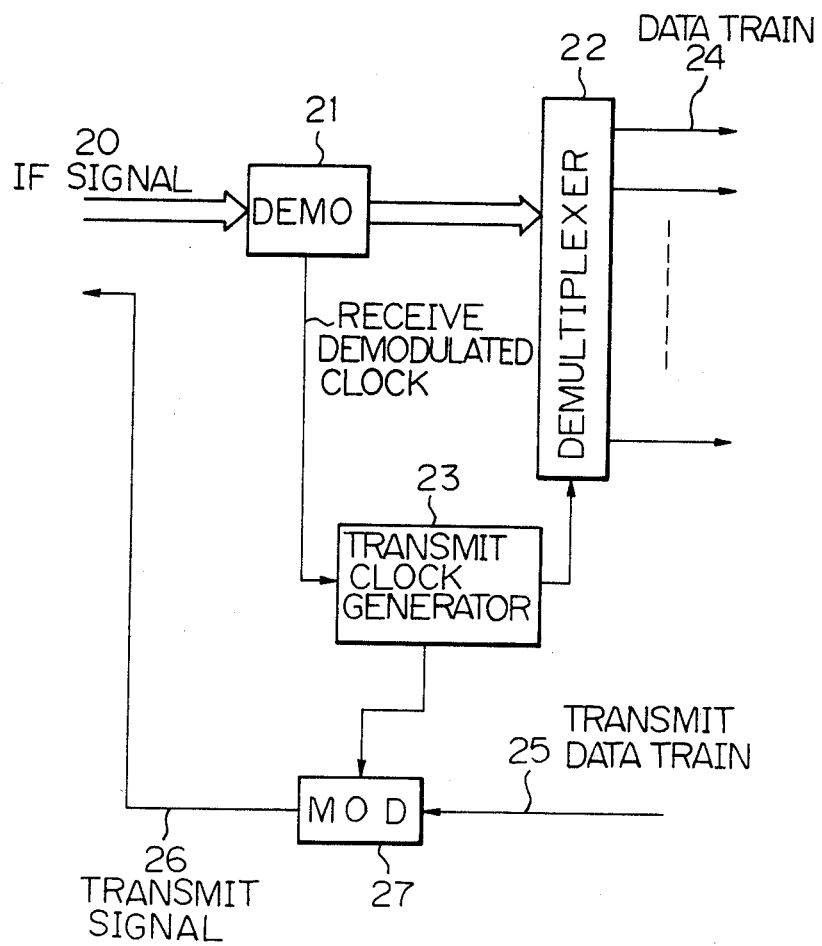
FIG. 3 is a block diagram of a digital signal transmission means in a small earth station.

FIG. 3 is a block diagram of a transmission means of a digital signal in a small earth station. In the figure, the numeral 20 is a multiplexed IF signal from the relay earth station (through a satellite), 21 is a demodulator, 22 is a de-multiplexer, 23 is a clock signal generator, and 24 is a series of data trains each of which is separated from the multiplexed signal in the de-multiplexer 22. The small earth station takes one of the data trains, directed to its own station. The numeral 27 is a modulator. The numeral 25 is a transmission signal which is applied to the modulator 27. The output transmission signal 26 of the modulator 27 is transmitted to a satellite through a power amplifier (not shown).

The clock signal generator 23 in FIG. 3 operates based upon the receive clock which is the output of the demodulator 21. The clock generator 23 divides the receive clock to provide the reference clock frequency $f_0$ of the relay earth station of FIG. 2.

It should be noted that a Doppler effect would provide the frequency difference between a transmit side and a receive side. The received frequency $f_0'$ which considers the Doppler effect is shown below.

$$f_0' = f_0(1 + (1/c)(dv/dt)) \quad (2)$$

where c is the light velocity, dv/dt is the relative moving speed of a satellite between a relay earth station and a small earth station.

When a small earth station transmits a clock frequency $f_0'$ to a relay earth station, the clock frequency $f_0''$ at the relay earth station which reproduces the receive signal to provide the clock signal frequency $f_0''$, is shown below.

$$\begin{aligned} f_0'' &= f_0'(1 + (1/c)(dv/dt)) \\ &= f_0(1 + (1/c)(dv/dt))^2 \\ &= f_0[1 + (2/c)(dv/dt) + (dv/dt)^2] \end{aligned} \quad (3)$$

As the value $(dv/dt)^2$ in the equation (3) is very small and can be neglected, the error from the frequency $f_0$ is essentially $f_0(1+(2/c)(dv/dt))$. Therefore, the frequency error is twice as large as that of one way. The position control of a satellite is excellent lately enough to provide the value $(1/c)(dv/dt)$ less than $1 \times 10^{-8}$. Further, as the average position of a satellite at the particular location on the earth is constant, the doppler effect comes from only the movement in the north-south direction, during the period of one day and a little movement in east-west direction.

As for the latter, when the moving length of a satellite exceeds the allowable limit, the satellite moves in the opposite direction. Therefore, a satellite moves around the predetermined position, and the moving speed may be either positive or negative. Therefore, an elastic buffer memory has only to have a capacity to absorb the movement of a satellite to synchronize demodulated digital signal of each small earth station with the reference clock frequency $f_0$ in a relay earth station.

For instance, when $f_0$ is 64 kHz, the capacity M of an elastic buffer memory for absorbing the Doppler effect is approximately;

$$\begin{aligned} M &< 64 \times 10^3 \times 2 \times 10^{-8} \times 3600 \times 12 + (\alpha) \\ &< 55 + (\alpha) \end{aligned}$$

where $3600 \times 12$ is half day hours (in seconds) for the Doppler effect in the north-south direction (the Doppler effect in the other half day hour is opposite), and $(\alpha)$ is the Doppler error due to the east-west movement and is smaller than that of the north-south movement.

As mentioned above, each small earth station uses a receive clock signal from a relay earth station through a satellite, and the relay earth station absorbs the Doppler errors of the frequency from each small earth station by using an elastic buffer memory. Therefore, all the digital signals from each small earth station are synchronized, thus, all the signals from the small earth stations are multiplexed on a time axis.

The above explanation concerns a pre-assignment system in which a transponder on a satellite is occupied irrespective of presence of speech in a circuit.

The present invention is applicable not only to a pre-assignment system, but also to a demand assignment system in which when a call exists in a small earth station, a communication circuit through a satellite is established. The demand assignment system is advantageous to increase the number of small earth stations which are coupled with a satellite.

Figure 4:
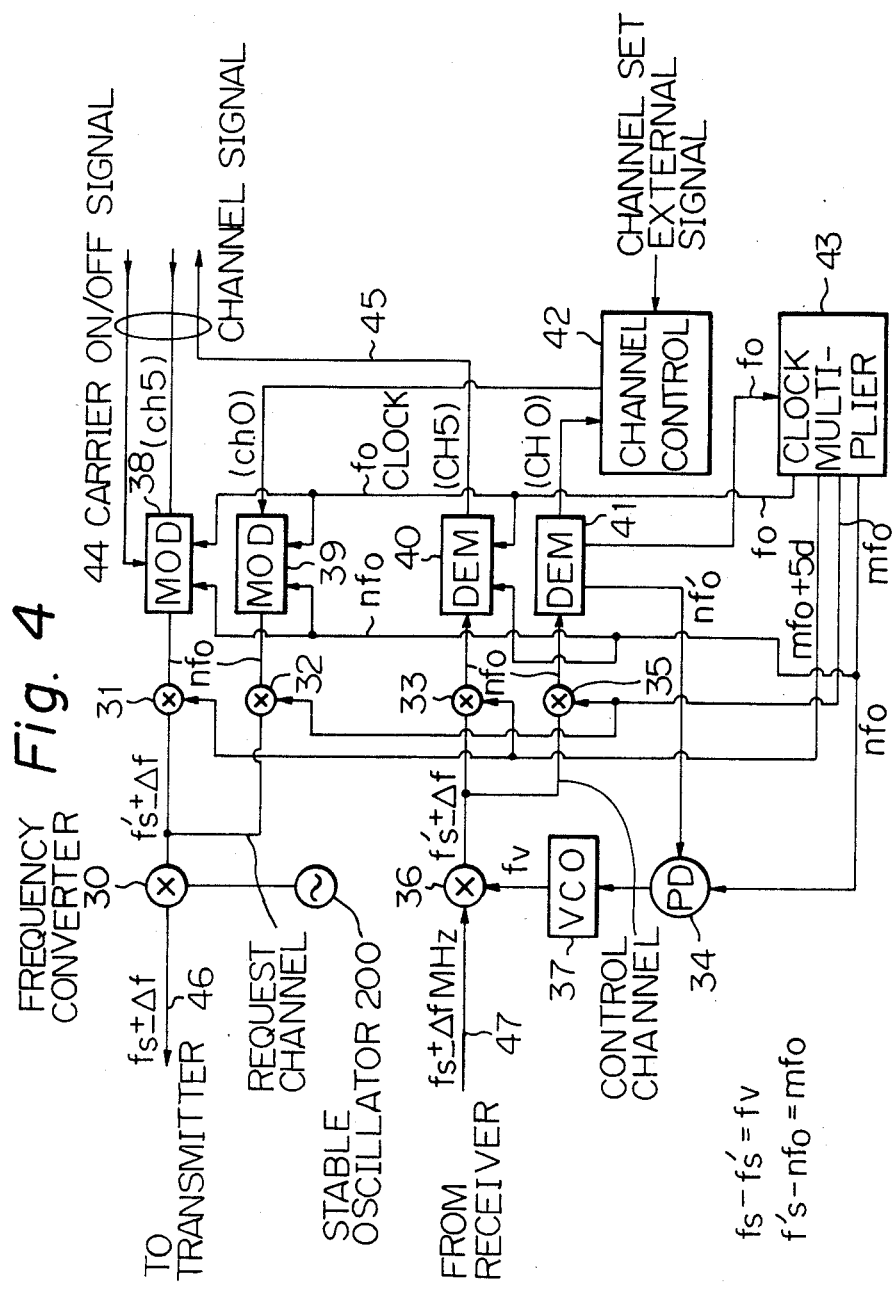
FIG. 4 is a block diagram of a modem of a small earth station which uses a demand assignment system.
Figure 5:
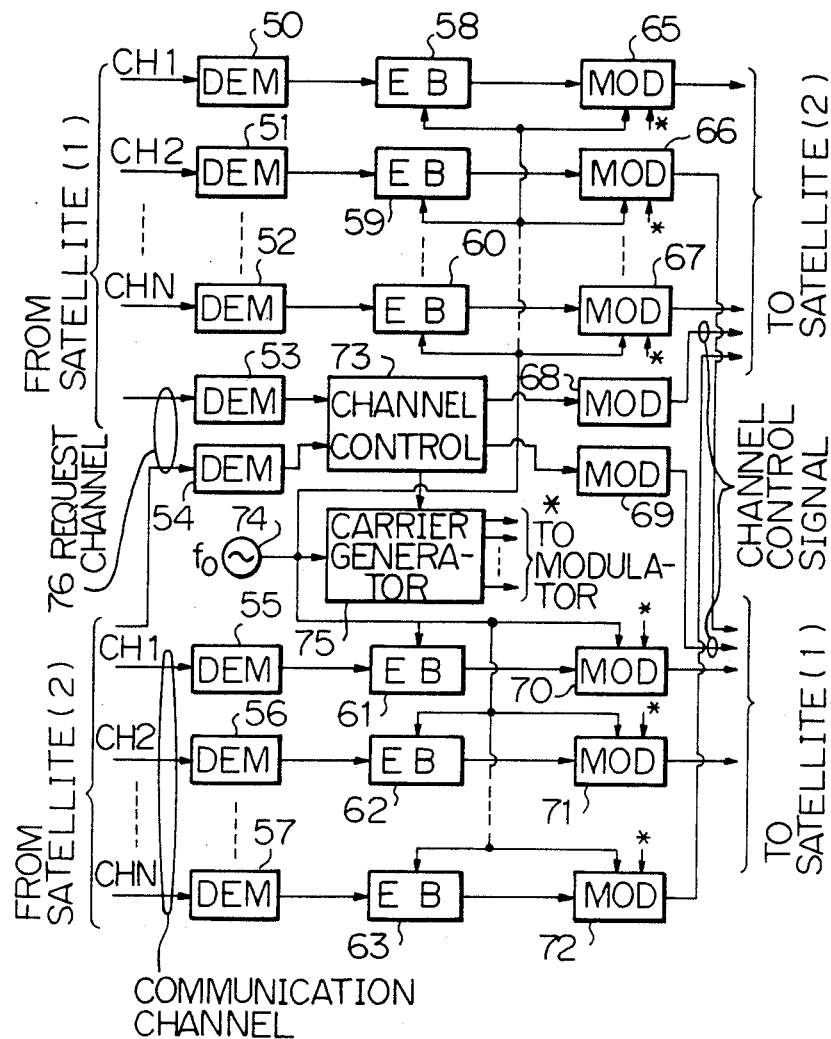
FIG. 5 is a block diagram of a modem in a relay station.

FIG. 4 shows a block diagram of a modem in a small earth station for a demand assignment system. FIG. 5 shows a block diagram of a modem in a relay earth station for a demand assignment system. A communication channel is established for each voice channel in the demand assignment system, as a channel is established upon each call.

In FIG. 4, the numerals 30 through 36 are frequency converters, 40 and 41 are demodulators, 38 and 39 are modulators, 42 is a circuit control for establishing a circuit, 43 is a clock frequency multiplier circuit, 37 is a voltage controlled oscillator, 46 is a output transmit signal, 100 is a high stable oscillator, and 47 is a recieve signal.

Figure 6:
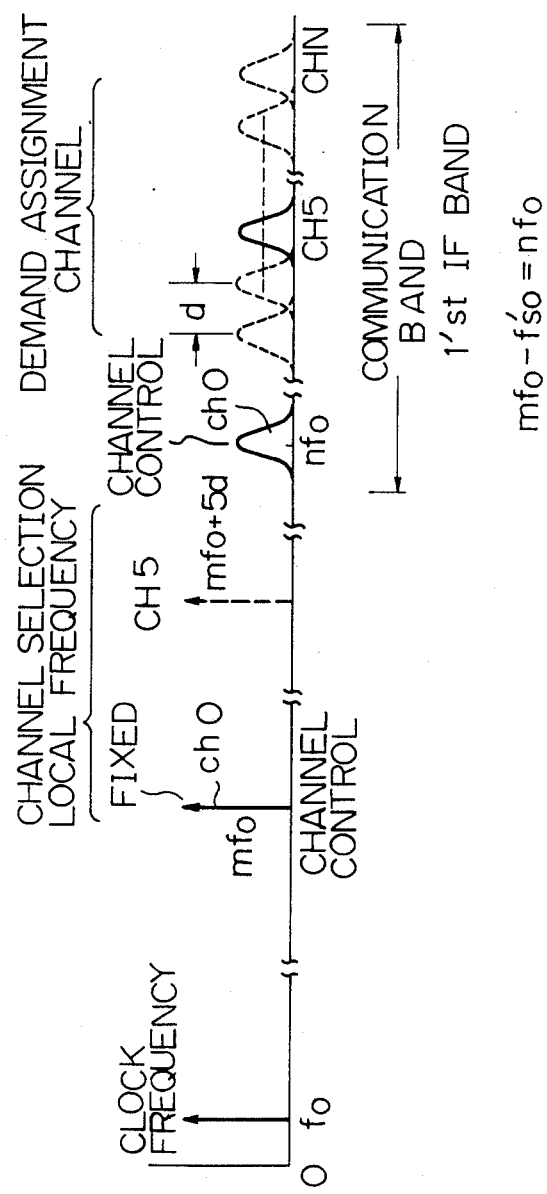
FIG. 6 is an explanatory drawing of operation of reception side.

In the present embodiment, a control channel for establishing a circuit from a relay earth station to a small earth station is channel 0 (ch-0), and a request signal from a small earth station to a relay station also uses channel 0 (ch-0). The communication voice channel is the channel 5 (ch-5) as shown in FIG. 6.

In FIG. 5 which shows a modem in a relay earth station, the numerals 50 through 57 are demodulators, 58 through 63 are elastic buffer memories, and 65 through 72 are modulators. The numeral 73 is a channel control circuit, 74 is a reference clock generator, and 75 is a carrier generator which supplies carrier signal to each modulators according to the output signal of the reference clock generator 74.

It is assumed that one of the small earth stations has a call to another small earth station. The establishment of a circuit between two small earth stations and the operation of each earth stations in that case are described.

A channel set external signal is applied to the channel control circuit 42 in FIG. 4, when a call is generated. The channel circuit 42 sends the necessary information to the relay earth station through the request channel (ch-0) through the modulator 39 and the frequency converters 32 and 30 (and of course the satellite). The request channel (ch-0) is common to all the small earth stations. When no simultaneous call is generated in a plurality of small earth stations, a random access system for that request channel is used.

A relay earth station of FIG. 5 informs the related two small earth stations of the necessary information for establishing a communication channel (ch-5 in the present embodiment) through the request channel (ch-0), through two satellites, by using a continuous signal.

When a circuit is established for each voice channel in a demand assignment system, and a signal is a voice signal in a digital form, the circuit occupied ratio in each direction of a circuit is less than 50% from the nature of a voice signal. Therefore, an ON/OFF system in which a transmission is carried out only when a speech exists, is preferable in view of the saving of transmit power of a satellite, and/or the decrease of intermodulation which is occured by the interference among a plurality of waves.

In case of ON/OFF system, the demodulation of a clock signal from a speech signal is difficult in a small earth station, because a clock signal must be reproduced continuously, and a synchronuous detection using the reproduced carrier wave is preferable. In order to solve this problem, according to the present invention, a carrier wave and a clock signal are reproduced for synchronous detection by using a continuous signal from a relay earth station. And, by using the reproduced clock signal, the reception channel which is designated by the relay earth station is demodulated.

As described before, a circuit control signal or a request channel from a relay earth station is a continuous signal, and a small earth station reproduces carrier wave and a clock signal which are necessary for demodulation, by using the continuous signal. It should be appreciated that it is very simple to derive a carrier wave and a clock signal when a reception signal is a continuous signal.

In FIG. 4, a signal from a satellite is shown by the reference numeral 47 which has the frequency $f_s \pm \Delta f$, where $\pm \Delta f$ is the bandwidth for including all the channels. That signal 47 (intermediate frequendy) is converted to the frequency $f'_s \pm \Delta f$ by the frequency converter circuit 36, which receives the local frequency from the voltage controlled oscillator 37. The second intermediate frequency $f'_s \pm \Delta f$ is converted by another frequency converter 35. The output of the converter 35 is a circuit control channel (request channel), and is applied to the demodulator 41, which has a carrier reproduction circuit and a clock reproduction circuit, and reproduces the carrier wave and clock signal from the receive continuous signal. The reproduced carrier signal has the multiple frequency $nf_0$ of the clock frequency $f_0$. The reproduced clock signal ($f_0$) is applied to the clock multiplier circuit 43, which generates the frequency up to $(m+L)f_0$ according to the frequencies $nf_0$ and $mf_0$, and the channel number to be established, where L is the channel number of a circuit. When the fifth channel is designated, the value L is 5.

The output frequency $nf_0$ of the clock multiplier circuit 43 is applied to the phase detector (PD) 34, which performs the phase detection between said signal $nf_0$ and the reproduced carrier wave ($nf_0'$) from the demodulator 41. When the two frequencies are the same as each other, the output of the phase detector 34 is zero, and if the two frequencies differ from each other, the voltage controlled oscillator 37 is adjusted so that the frequency difference becomes zero. When the frequency difference is zero, the intermediate frequency applied to the demodulator 41 is $nf_0$. While the local frequency applied to the frequency converter 35 is $mf_0$, the local frequency applied to another frequency converter 33 is $mf_0 + 5d$. The value d shows the channel space. That channel space is usually about 1.4 of the transmission speed. When the local frequency applied to the frequency converter 33 is $mf_0 + 5d$, the output frequency of the frequency converter 33 is always $nf_0$, because the channel space of an input signal is d.

In a transmission side, a channel signal is sent to a transmitter in the opposite manner of the reception side. In this case, the local frequency to the final frequency converter 30 is supplied by the high stable oscillator 200. The channel space d is produced according to the clock output of the demodulator 41. Those are easily implemented by the latest synthesizer technique.

Although the above explanation is directed to a communication between small earth stations through a relay earth station, the present invention is not restricted to that application, but is applicable to the communication between a large earth station and a small earth station. For instance, when a small station can not be coupled with a central station through a land line because of geographical condition, or when a satellite channel is cheaper than a land line, the satellite channel between a central earth station and a small earth station is advantageous. In that case, the second satellite 5 in FIG. 1 is omitted, and the communication is effected between the central station 3 and the small earth station group 1.

FIG. 6 shows the relations between the $f'_s$ at the reception side, and the local frequency which is applied to the frequency converters 33 and 35. When the center frequency of the receipt circuit control channel is $f'_{s0}$, the reception frequency of the fifth channel is $f'_{s0}+5d$. When the communication channel is x'th channel, the local frequency applied to the frequency converter 33 is $(mf_0+xd)$, so that the input frequency to the demodulator is $nf_0$ irrespective of channels. It should be appreciated that since the clock signals for each channel and the carrier waves in a relay earth station are generated based upon the reference clock in the relay earth station itself, no carrier wave regeneration circuit, nor clock regeneration circuit is required in the signal demodulator 40. That fact simplifies the structure of a demodulator. Although an ON/OFF system which transmits only when a speech exists, the disadvantage is that the carrier signal and the clock signal must be regenerated from the intermittent signal in a demodulation side. The present invention solved that disadvantage by producing the carrier wave and the clock signal according to the continuous reference signal. Further, as the present invention uses the local frequency for the frequency conversion according to the regenerated clock signal, an receipt ON/OFF signal is demodulated as if it is a continuous signal.

In a transmit side, the signal is transmitted in the opposite process of the receipt side. The outputs of the modulators 38 and 39 are the same output frequency $mf_0$, which is converted to the second intermediate frequency having the channel space d by the first frequency converter. That is implemented by using the common local frequency as that of the frequency converters 33 and 35. Those channels are converted to the third intermediate frequency by using the high stable local frequency from the oscillator 200. The signal 44 is the carrier ON/OFF signal which controls the modulator 38 so that the modulator 38 operates only when the speech exists.

FIG. 5 is a modem of a relay earth station. The relay earth station must synchronize all the transmission channels to be relayed. The clock synchronization is accomplished by using an elastic buffer memory, as described in accordance with FIG. 2. The demodulated signals of the outputs of the demodulators 50 through 57 are applied to the elastic buffer memories 58 through 63, which synchronize the signals based upon the reference freqency of the generator 74. Each demodulated signal is the baseband signal of the channel which is established by each small earth station through a request channel. The demodulated signal is sent to the designated small earth station through the channel designated by the relay earth station through the satellite. In one embodiment, among the outputs of the demodulators 50 through 53 from the first satellite, the outputs of the demodulators 50 and 52 are sent to the second satellite through the modulators 65 and 67. And, the output of the demodulator 51 is sent to the first satellite through the modulator 66 so that the signal is coupled with another small earth station which is accessed by the second satellite.

The demodulators 53 and 54 are used for demodulating the common channels in which each small earth station communicates with the relay earth station with the random access system when a call arises. The numeral 73 is a channel control circuit which detects a call of a small earth station in the output of the demodulators 53 and 54, and sends the information necessary to establish a circuit to a small earth station through the modulators 68 and 69. The outputs of the modulators 68 and 69 are continuous signals, in which an information for establishing a circuit is sent to each small earth station on a time division basis.

The output of the reference frequency generator 74 is applied to the carrier generator 75, which generates carrier frequencies for locating the channels with the frequency interval d. The output of the carrier generator 75 is sent to the modulators 65 through 72. The request channel 76 from each satellites is applied to the channel control 73 after demodulation. The request channel facilitates to establish the communication channel between two small earth stations through a first satellite and/or a second satellite by forwarding the necessary information including the channel number through the modulators 68 and 69.

As described above, each digital channel signal in each channel transmitted to the satellites are synchronized with each other, and shares the common clock signal. This simplifies the modem process and the frequency conversion process in the small earth stations.

The implementation of the ON/OFF system is conventional. For instance, a small earth station may turn on or turn off the modulator according to the voice level. Similarly, a relay earth station may implement the ON/OFF system according to the receipt level. Alternatively, a start signal for triggering the ON state may be inserted in a transmit side.

As described above in detail, according to the present invention, a small earth station can be coupled with any other small earth station all over the world through two satellites. Further, due to the clock synchronization system, the modulation and the demodulation in a small earth station are simplified. Further, since all the small earth stations are coupled with a common relay earth station, the relay earth station may monitor and/or control a small earth station. This facilitates the quick response in case of communication trouble.

An SCPC (single carrier per channel) communication system for both transmission and reception at a small earth station is possible in the present invention without using a pilot signal, since an operational clock signal is derived from a continuous channel in a reception signal. Also, a synchronization detection of a reception signal is possible in the present invention by using said clock signal $f_c$. The synchronization detection is preferable to quick response for a speech switch for voice activation. If a pilot signal is used to take a clock signal, a synchronization detection would be impossible.

From the foregoing it will now be apparent that a new and improved satellite communication system has been found. It should be understood of course that the embodiments disclosed are merely illustrative and are not intended to limit the scope of the invention. Reference should be made to the appended claims, therefore, rather than the specification as indicating the scope of the invention.

What is claimed is:
1. A satellite communication system comprising:
   a plurality of earth stations, at least one of said plurality of earth stations being an originating earth station and at least one of said plurality of earth stations being a destination earth station;
   a relay earth station which transmits at a higher power than each of said earth stations;
   a satellite coupled with said plurality of earth stations and said relay earth station through a wireless path;

said originating earth station sending a modulated signal in a digital form to said relay earth station through said satellite, said relay earth station demodulating a reception signal from said origination earth station, effecting an error correction process, modulating said demodulated reception signal, and sending a modulated signal to said destination earth station through said satellite, communication among said plurality of earth stations being provided through said relay earth station, said relay earth station multiplexing demodulated signals from said plurality of earth stations, and modulating and sending multiplexed signals to said destination earth stations through said satellite, each of said plurality of earth stations having a clock derive circuit for deriving a clock signal from a continuous channel of a reception signal from said relay earth station, and transmitting a signal according to said derived clock signal, said relay earth station having a doppler absorption circuit for absorbing doppler error of frequency drift of said reception signal from said plurality of earth stations by synchronizing said reception signal with a fixed reference frequency in the relay earth station, so that the relay earth station sends a signal after absorbing doppler error of said reception signals.

2. A satellite communication system according to claim 1, wherein a relay earth station sends a plurality of carrier signals to said plurality of earth stations, including a first carrier signal for transmitting digital modulated signals, and a second continuous carrier signal for common control, said first carrier signal is synchronized with said second continuous carrier signal.

3. A satellite communication system according to claim 2, wherein each of said earth stations derives a reference carrier signal and a symbol clock from said second continuous carrier signal, and providing a carrier signal and a clock signal for demodulating digital modulated signals according to said derived reference carrier signal and said symbol clock.

* * * * *